(12) United States Patent
Roh et al.

(10) Patent No.: US 11,952,141 B2
(45) Date of Patent: Apr. 9, 2024

(54) FUEL CELL POWER PACK FOR DRONE AND STATE INFORMATION MONITORING METHOD THEREOF

(71) Applicant: DOOSAN MOBILITY INNOVATION INC., Yongin-si (KR)

(72) Inventors: Soon Suk Roh, Seoul (KR); Yong Shik Chong, Seongnam-si (KR)

(73) Assignee: DOOSAN MOBILITY INNOVATION INC.

( * ) Notice: Subject to any disclaimer, the term of this patent is extended or adjusted under 35 U.S.C. 154(b) by 850 days.

(21) Appl. No.: 16/766,133

(22) PCT Filed: Nov. 16, 2018

(86) PCT No.: PCT/KR2018/014106
§ 371 (c)(1),
(2) Date: May 21, 2020

(87) PCT Pub. No.: WO2019/103407
PCT Pub. Date: May 31, 2019

(65) Prior Publication Data
US 2020/0361623 A1  Nov. 19, 2020

(30) Foreign Application Priority Data

Nov. 24, 2017 (KR) .......................... 10-2017-0158593

(51) Int. Cl.
*B64D 37/30* (2006.01)
*B64C 19/02* (2006.01)
(Continued)

(52) U.S. Cl.
CPC .............. *B64D 37/30* (2013.01); *B64C 19/02* (2013.01); *B64C 39/024* (2013.01); *B64D 31/00* (2013.01);
(Continued)

(58) Field of Classification Search
CPC ................................................. H01M 2250/20
See application file for complete search history.

(56) References Cited

U.S. PATENT DOCUMENTS

| | | | |
|---|---|---|---|
| 2008/0075991 A1* | 3/2008 | LaVen ............... | H01M 8/04805 429/513 |
| 2011/0281192 A1* | 11/2011 | Jones ...................... | B26F 1/384 429/457 |

(Continued)

FOREIGN PATENT DOCUMENTS

| | | |
|---|---|---|
| CN | 202423474 U | 9/2012 |
| CN | 106058283 A | 10/2016 |

(Continued)

OTHER PUBLICATIONS

CN OA dated Nov. 30, 2022.

*Primary Examiner* — Matthew W Van Oudenaren
(74) *Attorney, Agent, or Firm* — Harvest IP Law, LLP

(57) ABSTRACT

A fuel cell power pack for a drone and a state information monitoring method thereof are provided. The fuel cell power pack for a drone may include a power pack main body coupled to the drone, a fuel cell stack module disposed in the power pack main body to receive fuel and air to supply a power to the drone, a state information detector configured to detect state information of the fuel cell stack module, a power pack communicator configured to transmit information to an outside of the power pack main body or receive the information from the outside thereof by wire or wirelessly, and a power pack controller configured to control the power pack communicator to transmit the state information of the fuel cell stack module detected by the state information detector to the outside of the power pack main body.

10 Claims, 10 Drawing Sheets

(51) Int. Cl.
  *B64C 39/02* (2023.01)
  *B64D 31/00* (2006.01)
  *H01M 8/04313* (2016.01)
  *H01M 8/0432* (2016.01)
  *H01M 8/0438* (2016.01)
  *H01M 8/04537* (2016.01)
  *H01M 8/04955* (2016.01)
  *H01M 8/2457* (2016.01)
  *H01M 8/249* (2016.01)

(52) U.S. Cl.
  CPC ... *H01M 8/04313* (2013.01); *H01M 8/04955* (2013.01); *H01M 8/249* (2013.01); *B64U 2201/20* (2023.01); *H01M 8/0432* (2013.01); *H01M 8/04388* (2013.01); *H01M 8/04559* (2013.01); *H01M 8/04589* (2013.01); *H01M 8/2457* (2016.02); *H01M 2250/20* (2013.01)

(56) References Cited

U.S. PATENT DOCUMENTS

| | | | |
|---|---|---|---|
| 2016/0293019 | A1 | 10/2016 | Kim et al. |
| 2017/0200961 | A1* | 7/2017 | Zheng ................ H01M 8/0656 |

FOREIGN PATENT DOCUMENTS

| | | |
|---|---|---|
| CN | 206040829 U | 3/2017 |
| JP | 2007048628 A | 2/2007 |
| JP | 2017205012 A | 11/2017 |
| KR | 10-1599423 B1 | 3/2016 |
| KR | 10-1687120 B1 | 12/2016 |
| KR | 10-1749577 B1 | 6/2017 |

* cited by examiner

[FIG. 1]
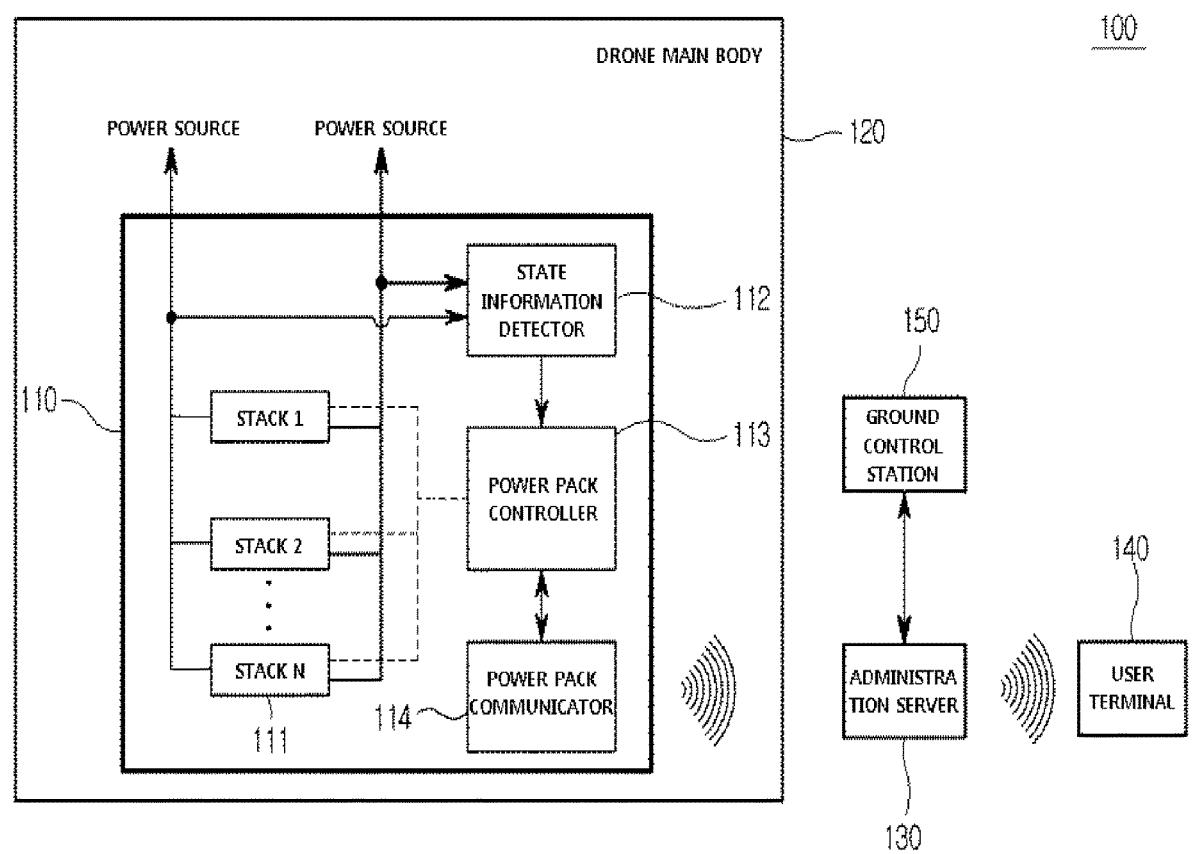

[FIG. 2]
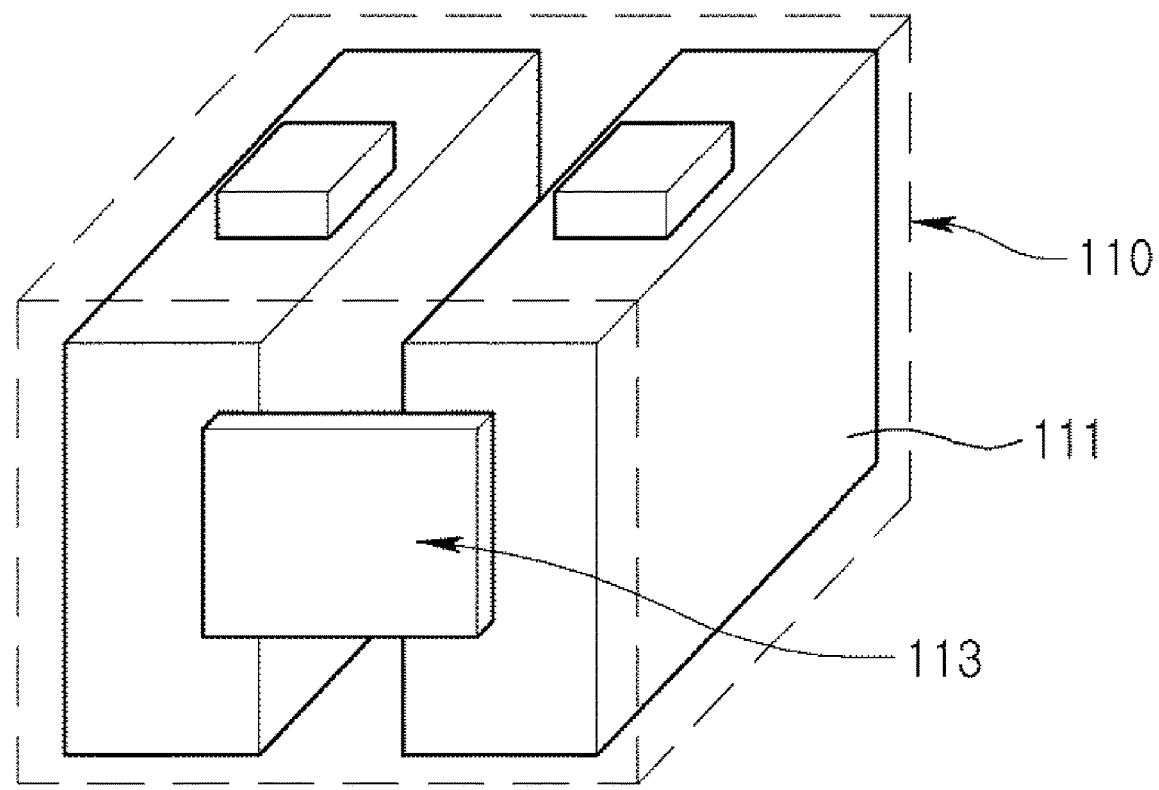

[FIG. 3]
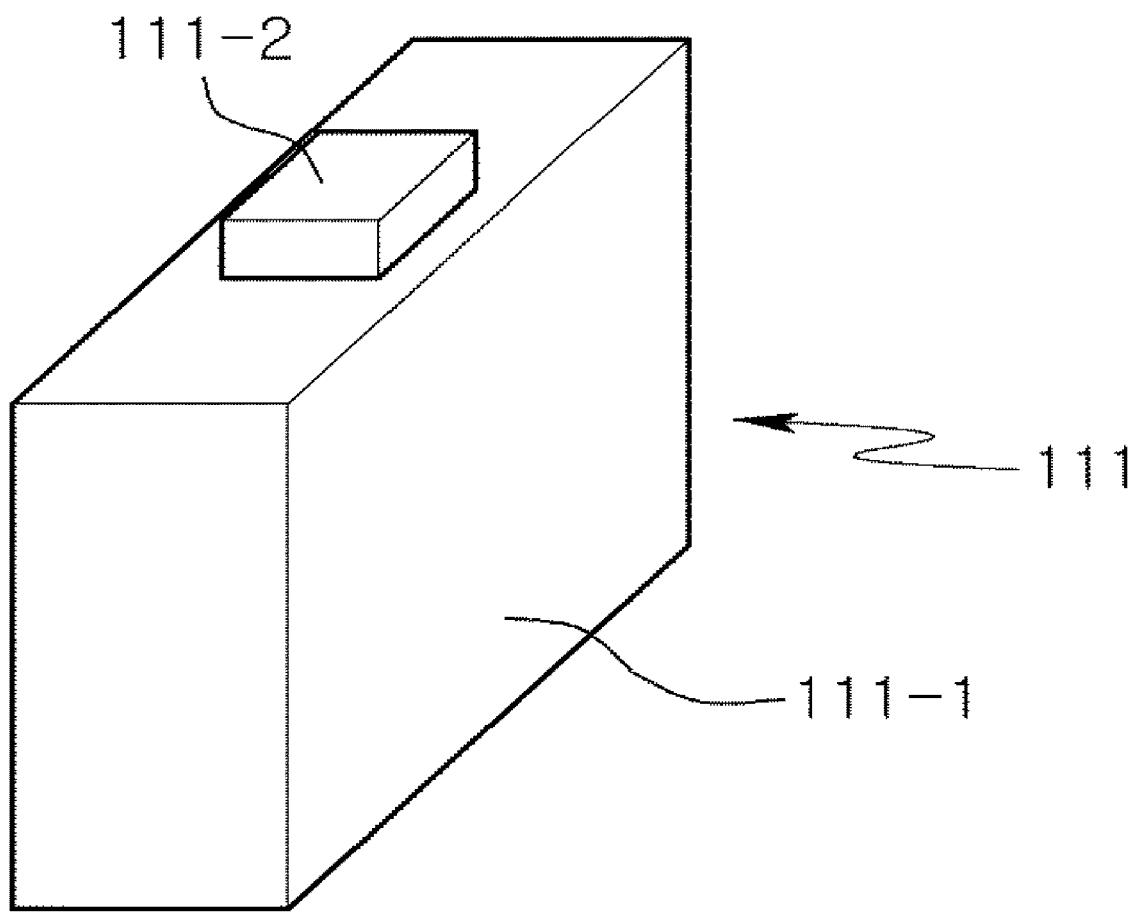

[FIG. 4]
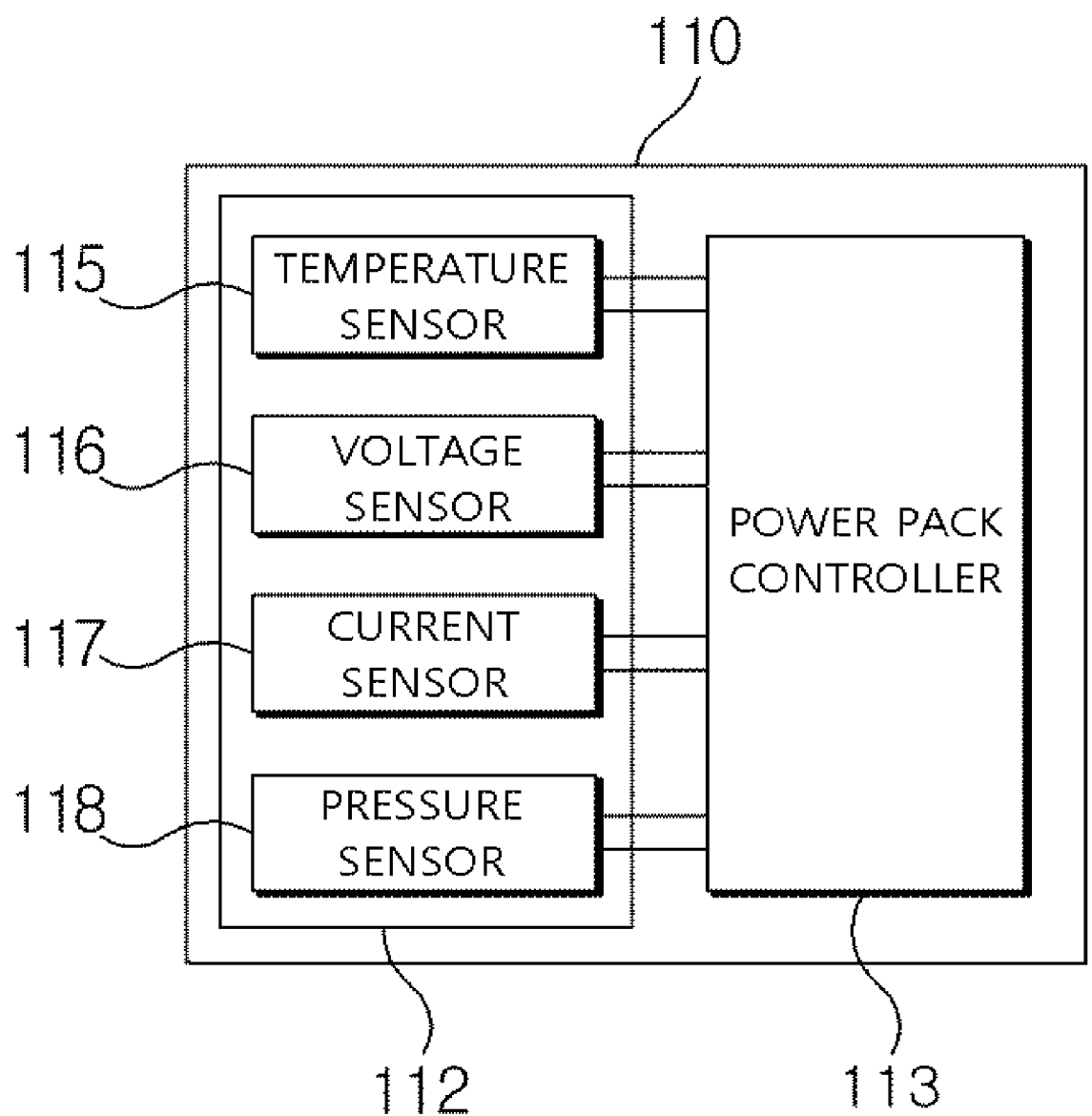

[FIG. 5]
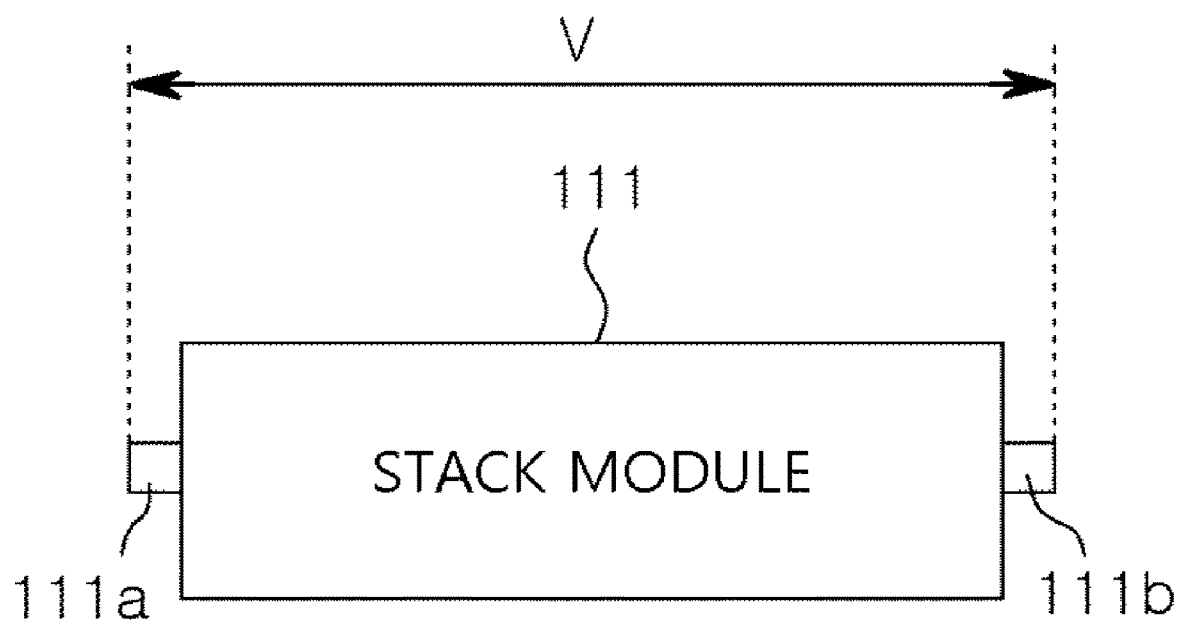

[FIG. 6]
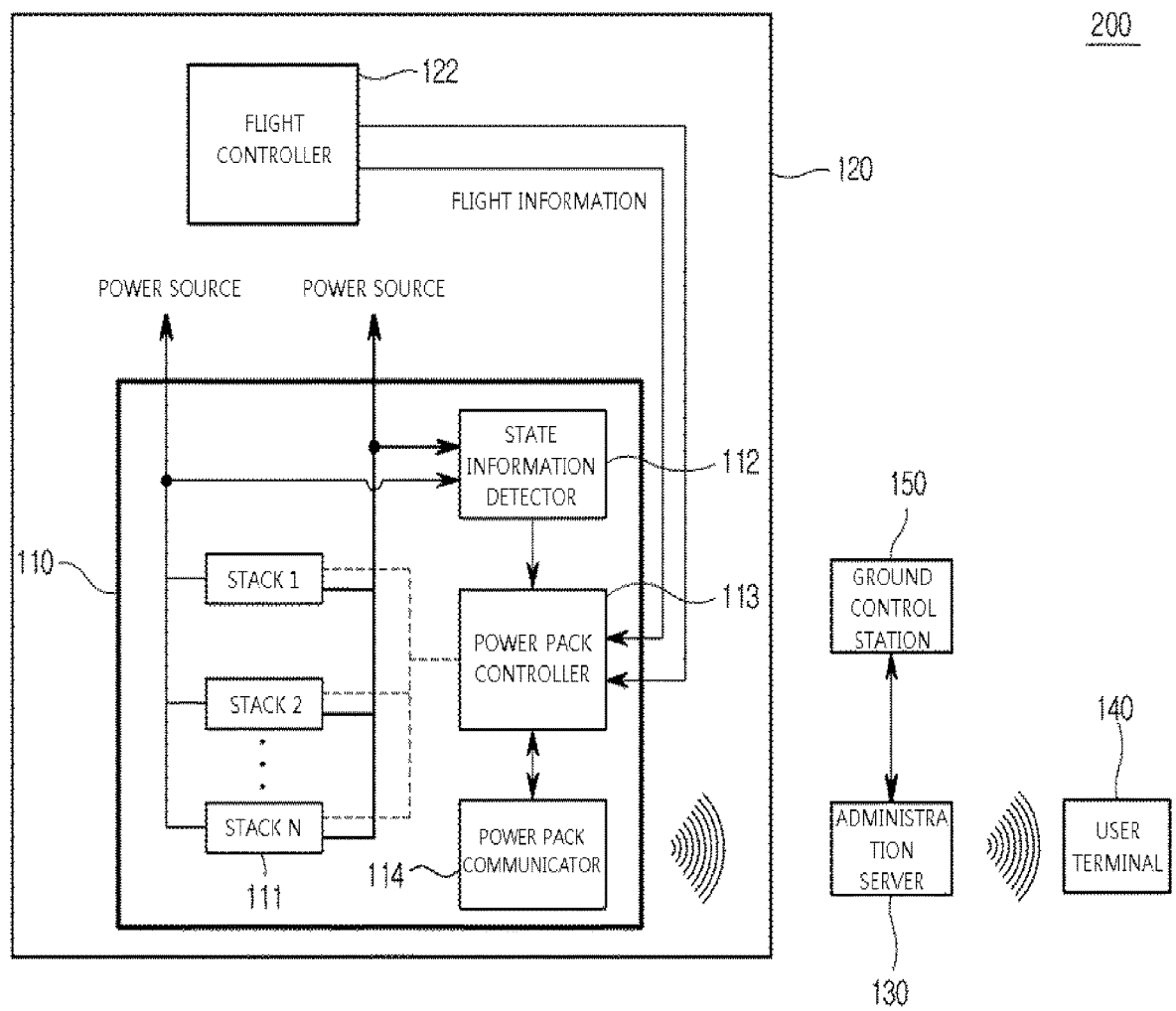

[FIG. 7]
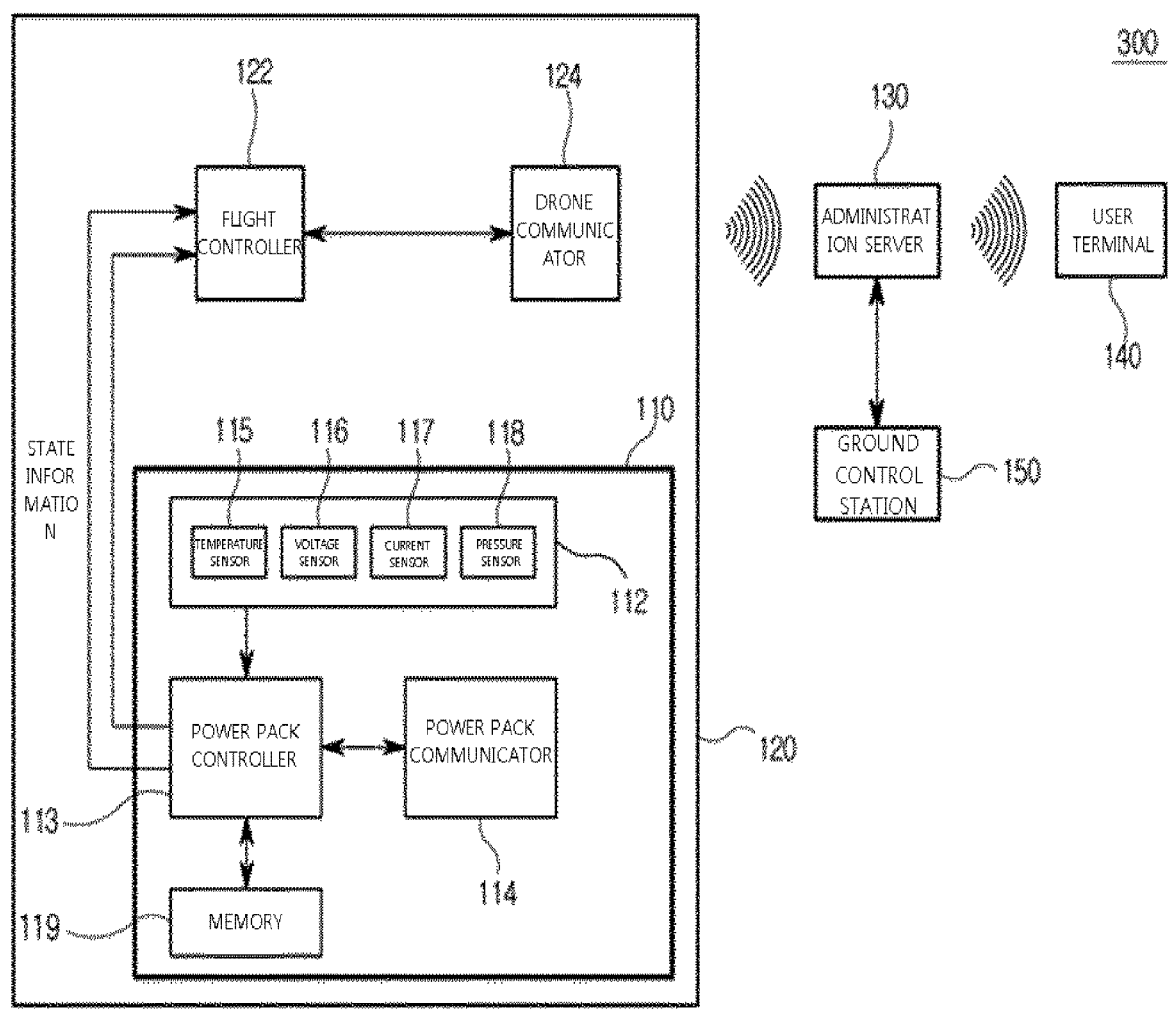

[FIG. 8]
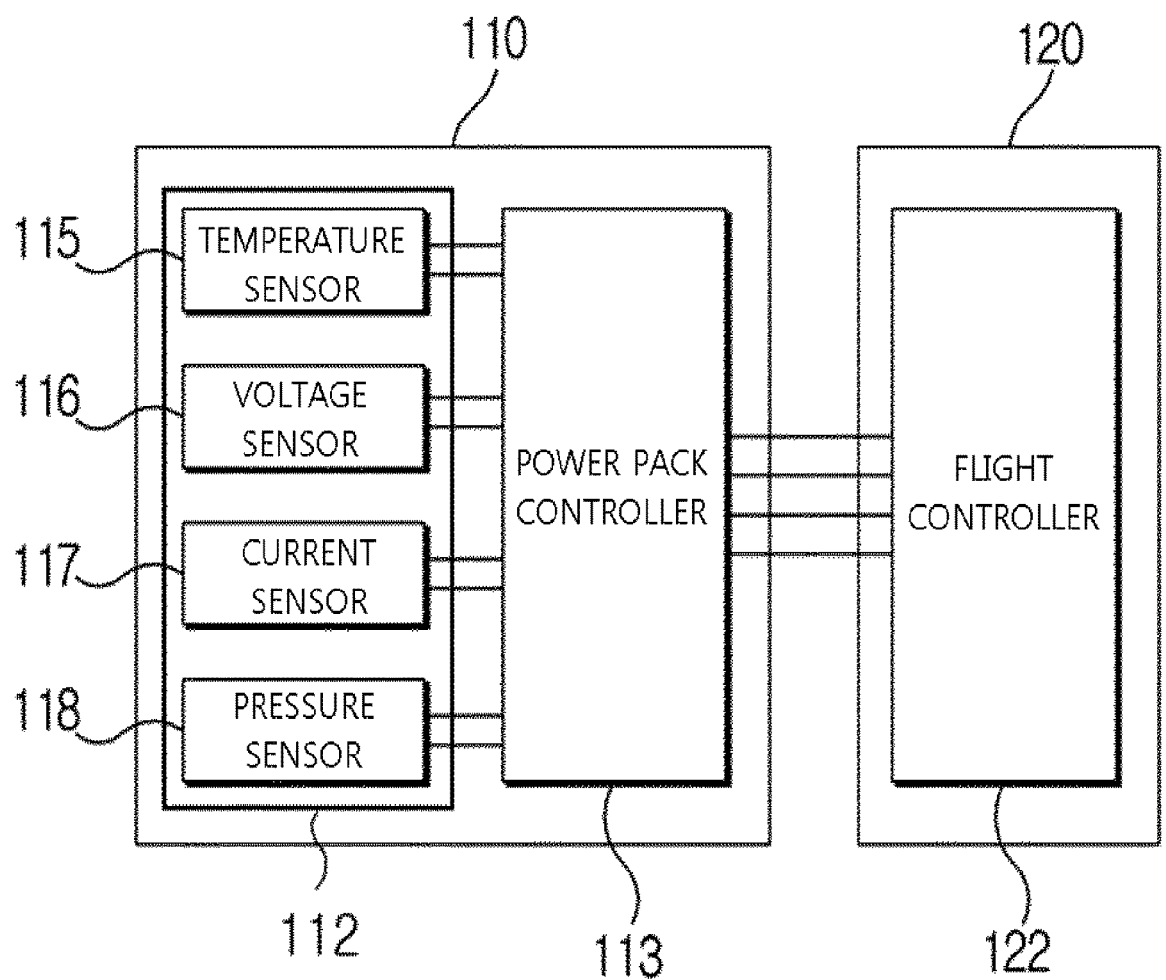

[FIG. 9]
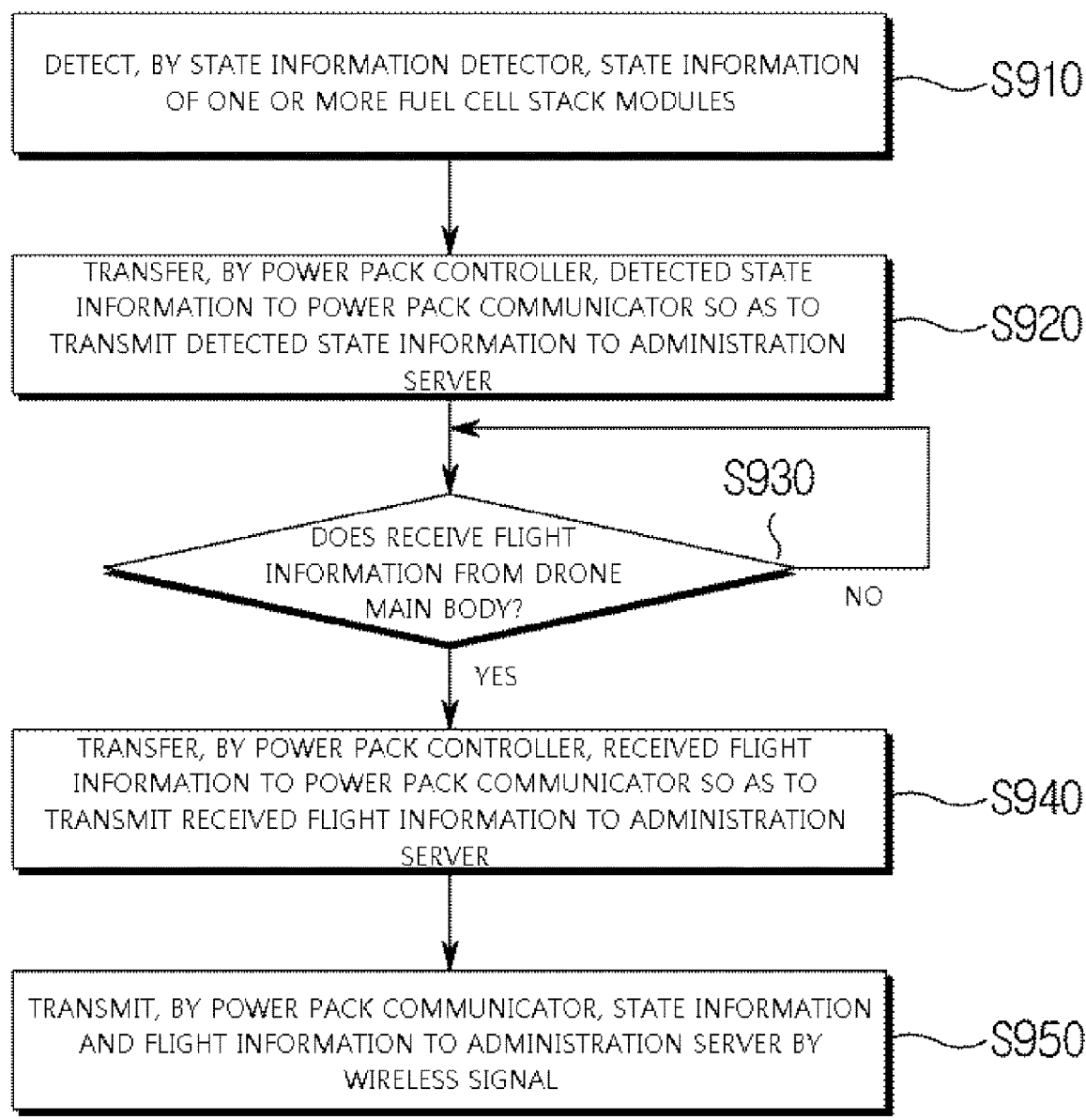

[FIG. 10]
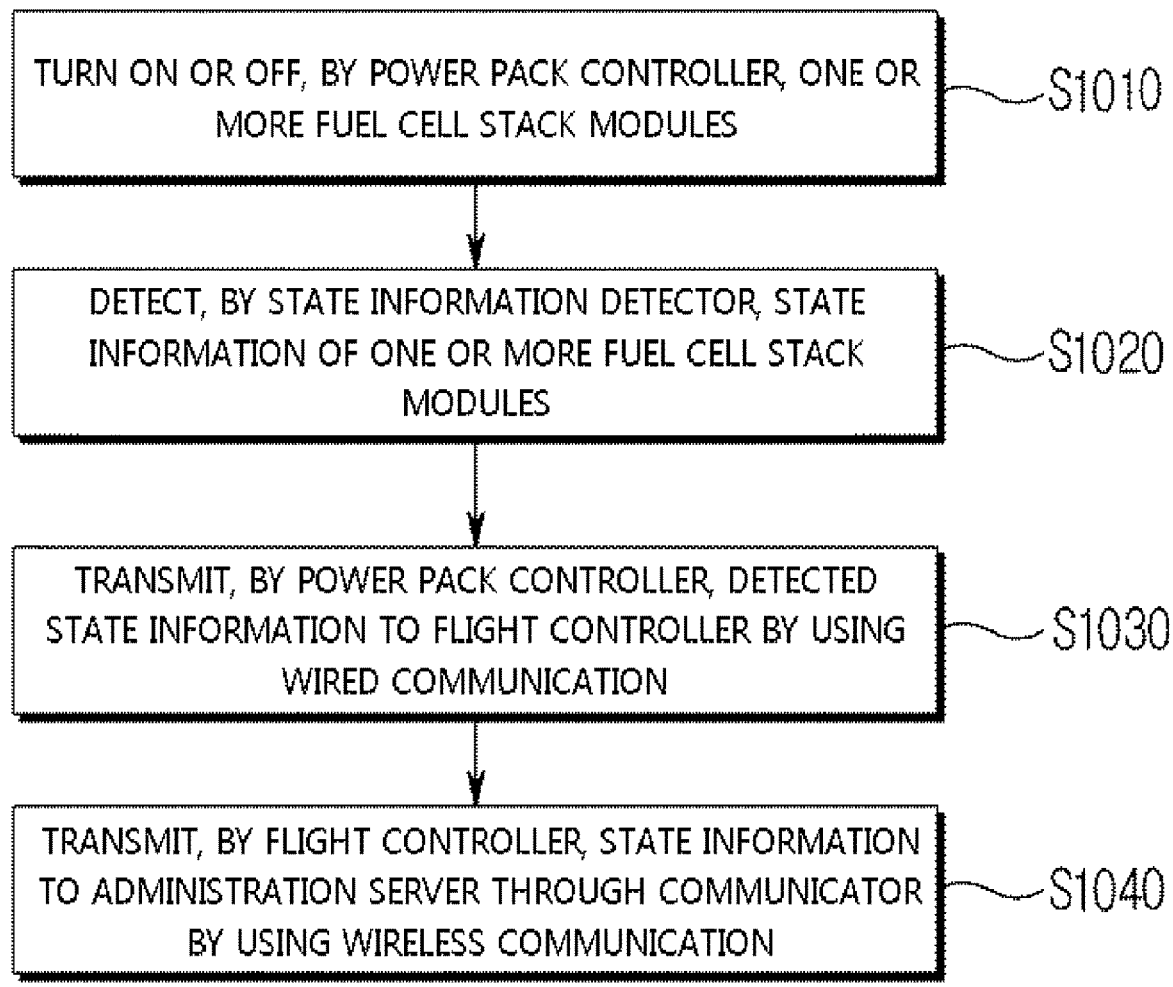

FUEL CELL POWER PACK FOR DRONE AND STATE INFORMATION MONITORING METHOD THEREOF

TECHNICAL FIELD

Apparatuses and methods consistent with exemplary embodiments relate to a fuel cell power pack for a drone and a state information monitoring method thereof, and more particularly, to controlling a fuel cell power pack and monitoring a state of the fuel cell power pack based on state information of a fuel cell stack module and flight information of a drone to increase a flight time and payload.

DESCRIPTION OF THE RELATED ART

A drone is a type of unmanned flight vehicle flying in the sky by rotating a plurality of propellers by using power of a battery, and is implemented to enable the flight by a remote control operation or an automatic navigation system.

The drone was initially developed as a military unmanned aerial vehicle, but in recent years, the drone is also used for corporate, media, and personal use.

For example, the newspaper, broadcast industry, or film production companies are using the drone as shooting equipment, and the delivery industry will use the drone for actual delivery services within a few years.

In particular, IT companies such as Google, Facebook, and Amazon have recently invested in drone development, among which Amazon has unveiled a delivery system using the drone to automate inventory management and distribution systems. That is, researchers who develop the drone were largely employed for the distribution services in which the drone takes over the work operated by the courier staff However, because the drone developed so far has a drawback in that the battery is highly consumed, there is a problem in that the power stored in the battery is discharged in a short time due to a delivery distance and a load caused by delivery items, when using the drone for the purpose of delivery.

A fuel cell is an alternative means of the battery for solving the problem. Unlike the battery, the fuel cell is a system which generates power as soon as fuel is put, thereby enabling the drone to fly longer as compared to a case in which the battery is used.

As the drone may fly for a long time, a flight command system and monitoring are more important. Currently, most drones fly according to a remote control of the remote controller and the distance at which the drone may fly is short. In order for the drone to fly for a long time, the flight in an invisible area is required and in this case, the drone and state information of the fuel cell which supplies power thereto may be required to be monitored. Further, an existing drone has confirmed the battery state by measuring only a voltage value of the battery, but in the case of the fuel cell, it is important to exchange information about the state of the drone.

SUMMARY

Aspects of one or more exemplary embodiments provide a fuel cell power pack for a drone and a state information monitoring method thereof, in which if the fuel cell power pack which supplies power by using gas such as hydrogen is mounted to the drone, a fuel cell power pack detects its own state information to transmit the state information to an administration computer or a user's smart terminal on the ground, or share the state information with a drone, and receives flight information from the drone to transmit the flight information to the administration computer, the user's terminal, or the like so as to increase a flight time and payload, thereby monitoring the fuel cell state to be used for the long-time flight operation of the drone.

Additional aspects will be set forth in part in the description which follows and, in part, will become apparent from the description, or may be learned by practice of the exemplary embodiments.

According to an aspect of an exemplary embodiment, there is provided a fuel cell power pack for a drone including: a power pack main body coupled to the drone, a fuel cell stack module disposed in the power pack main body to receive fuel and air to supply a power to the drone, a state information detector configured to detect state information of the fuel cell stack module, a power pack communicator configured to transmit information to an outside of the power pack main body or receive the information from the outside thereof by wire or wirelessly, and a power pack controller configured to control the power pack communicator to transmit the state information of the fuel cell stack module detected by the state information detector to the outside of the power pack main body.

The fuel cell stack module may include a plurality of fuel cell stacks which are electrically connected to each other, and the power pack controller may turn on or off each of the plurality of fuel cell stacks according to the detected state information of the state information detector.

The power pack controller may control the power pack communicator to wirelessly transmit the state information of the fuel cell stack module to an administration server.

The power pack controller may control the power pack communicator to wirelessly transmit flight information and the state information of the fuel cell stack module to an administration server by receiving the flight information from the drone.

The power pack controller may control the power pack communicator to transmit the state information of the fuel cell stack module to the drone by wire.

The state information detector may detect information of at least any one among a temperature, a voltage, a current, and a pressure of the fuel cell stack module or a pressure of hydrogen fuel.

According to an aspect of another exemplary embodiment, there is provided a drone operation system including: a drone including a flight controller and a power pack main body coupled to the drone, and the power pack main body may include a fuel cell stack module configured to receive fuel and air to supply a power to the drone, a state information detector configured to detect state information of the fuel cell stack module, a power pack communicator configured to transmit information to an outside of the power pack main body or receive the information from the outside thereof by wire or wirelessly, and a power pack controller configured to control the power pack communicator to transmit the state information of the fuel cell stack module detected by the state information detector to the outside of the power pack main body.

The fuel cell stack module may include a plurality of fuel cell stacks which are electrically connected to each other, and the power pack controller may turn on or off each of the plurality of fuel cell stacks according to the detected state information of the state information detector.

The power pack controller may control the power pack communicator to wirelessly transmit the state information of the fuel cell stack module to an administration server or a user terminal.

The power pack controller may control the power pack communicator to wirelessly transmit flight information and the state information of the fuel cell stack module to an administration server or a user terminal by receiving the flight information from the drone.

The power pack controller may control the power pack communicator to transmit the state information of the fuel cell stack module to the flight controller by wire.

The drone may further include a drone communicator, and the flight controller may control the drone communicator to wirelessly transmit the state information of the fuel cell stack module received through the power pack communicator to an administration server or a user terminal.

The flight controller may control the drone communicator to wirelessly transmit the flight information of the drone together with the state information to the administration server or the user terminal.

According to an aspect of another exemplary embodiment, there is provided a method for providing state information of a fuel cell power pack for a drone, the method including: detecting state information of a fuel cell power pack which supplies a power to the drone, storing the state information of the fuel cell power pack in a memory, and wirelessly transmitting the stored state information of the fuel cell power pack to an administration server or a user terminal.

The fuel cell power pack may include a plurality of fuel cell stack modules which are electrically connected to each other, and the method may further include turning on or off each of the fuel cell stack modules according to the state information of the fuel cell stack modules.

The method may further include receiving, by the fuel cell power pack, flight information from the drone, and the transmitting of the state information may include wirelessly transmitting the flight information and the state information to the administration server or the user terminal.

The transmitting of the state information may include transmitting the state information of the fuel cell power pack to a flight controller of the drone by wire and wirelessly transmitting, by the flight controller, the state information of the fuel cell power pack to the administration server or the user terminal.

The state information of the fuel cell power pack may include information of at least any one among a temperature, a voltage, a current, and a pressure of the fuel cell power pack or a pressure of hydrogen fuel.

According to the present disclosure, by mounting the fuel cell power packs including the plurality of fuel cell stack modules to the drone, and automatically selecting the fuel cell stack module according to the power consumption of the drone to variably provide power, it is possible to respond automatically to the power required for the flight of the drone.

Further, the fuel cell power pack may confirm the state information through each sensor, and transmit the confirmed state information to the administration server on the ground via the drone, or directly transmit the confirmed state information to the administration server on the ground by using the wireless communication function.

Further, the structure which may not receive the flight information of the drone may transmit the information of the fuel cell power pack to the ground administration server by using the wireless communication function. Accordingly, the administration server may use the state information received from the fuel cell power pack to apply the flight operation of the drone, or transmit the received state information to the user terminal so that the user (e.g., an administrator) confirms the flight of the drone, the power supply state, and the state of the fuel cell power pack.

Further, the fuel cell as the alternative means of the battery is a system which generates power as soon as the fuel is put, such that by mounting the fuel cell power pack to the drone, the drone can fly for a longer time as compared to a case in which the battery is used.

Further, most of the existing drones fly according to the remote control of the remote controller and the flight distance of the drone is very short, whereas the present disclosure may highlight the importance of the flight command system of the drone and the monitoring thereof as the long-time flight is possible.

Further, by monitoring the state information of the fuel cell power pack which supplies power to the drone, the drone may fly in the invisible area for a long time.

Further, the existing drone has confirmed the battery state by measuring the voltage value of the battery, but the fuel cell according to the present disclosure may exchange the flight information of the drone, thereby adjusting the flight time of the drone according to the state of the fuel cell power pack.

BRIEF DESCRIPTION OF DRAWINGS

The above and/or other aspects and features will become more apparent from the following detailed description of the exemplary embodiments, taken in conjunction with the accompanying drawings, in which:

FIG. 1 is a block diagram schematically illustrating an overall configuration of a platform system to which a fuel cell power pack for a drone according to a first exemplary embodiment is applied;

FIG. 2 is a diagram schematically illustrating a structure of the fuel cell power pack according to an exemplary embodiment;

FIG. 3 is a diagram schematically illustrating a structure of a stack module according to an exemplary embodiment;

FIG. 4 is a block diagram schematically illustrating an internal configuration of the fuel cell power pack according to an exemplary embodiment;

FIG. 5 is a diagram illustrating an example of detecting a voltage level through a state detector with respect to the fuel cell power pack according to an exemplary embodiment;

FIG. 6 is a block diagram schematically illustrating an overall configuration of a platform system to which a fuel cell power pack for a drone according to a second exemplary embodiment is applied;

FIG. 7 is a block diagram schematically illustrating an overall configuration of a platform system to which a fuel cell power pack for a drone according to a third exemplary embodiment is applied;

FIG. 8 is a diagram illustrating an example in which the fuel cell power pack for the drone according to the third exemplary embodiment transfers state information to a flight controller of a drone main body by wire;

FIG. 9 is an operational flowchart for explaining a state information monitoring method of the fuel cell power pack for the drone according to an exemplary embodiment; and FIG. 10 is an operational flowchart for explaining a state information monitoring method of the fuel cell power pack for the drone according to another exemplary embodiment.

DETAILED DESCRIPTION

Various modifications may be made to the embodiments of the disclosure, and there may be various types of embodiments. Thus, specific embodiments will be illustrated in the accompanying drawings and the embodiments will be described in detail in the description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing the embodiments, detailed explanation of related known technologies may unnecessarily confuse the gist of the disclosure, the detailed explanation will be omitted.

The terminology used herein is for the purpose of describing particular embodiments only and is not intended to limit the scope of the disclosure. Throughout the specification, when an element is referred to as being "connected" to another element, it may not only indicate that the elements are "directly connected" to each other, but also indicate that the elements are "electrically connected" to each other with another element interposed therebetween. Further, when a part is referred to as "including" an element, unless otherwise described, this means that another element may be additionally included is excluded, rather than precluding the same.

When an element is referred to as being "above" or "on" another element, it may be directly on the other element while making contact with the other element or may be above the other element without making contact with the other element.

The terms such as first, second and third may be used to describe various parts, components, regions, layers, and/or sections, but not limited thereto. The terms are used only to distinguish any one part, component, region, layer, or section from another element, component, region, layer, or section. Accordingly, a first part, component, region, layer, or section may be referred to as a second part, component, region, layer, or section without departing from the scope of the present disclosure.

The expertise terms used herein are used only to describe a specific embodiment, and do not limit the present disclosure. Singular forms used herein may include plural forms unless referred to the contrary. In this specification, terms such as "comprise", "include", or "have/has" should be construed as designating that there are such features, integers, steps, operations, elements, components, and/or a combination thereof in the specification, not to exclude the presence or possibility of adding one or more of other features, integers, steps, operations, elements, components, and/or combinations thereof.

The terms such as "below" and "above", indicating relative spaces, may be used to easily describe the relation between one part and another part, which are illustrated in a drawing. Such terms may include not only a meaning intended in the drawing, but also another meaning or operation of a device in use. For example, when a device in the drawing is overturned, parts described as being "below" other parts may be described as being "above" the other parts. Accordingly, the exemplary term "below" may include meanings of both above and below. The device may be rotated by 90 degrees or different angles, and the terms indicating relative spaces may be analyzed according to the rotation.

All terms including technical or scientific terms used herein have the same meanings as the meanings which are generally understood by those skilled in the art to which the present disclosure pertains, unless otherwise defined. The terms defined in a generally used dictionary may be additionally analyzed to have meanings which coincide with the related technical documents and the contents disclosed, and as long as the terms are not clearly defined, the terms are not analyzed as ideal or excessively formal meanings.

In an exemplary embodiment, "a module," "a unit," or "a part" performs at least one function or operation, and may be realized as hardware, such as a processor or integrated circuit, software that is executed by a processor, or a combination thereof. In addition, a plurality of "modules," a plurality of "units," or a plurality of "parts" may be integrated into at least one module or chip and may be realized as at least one processor except for "modules," "units" or "parts" that should be realized in a specific hardware.

Hereinafter, exemplary embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

FIG. 1 is a block diagram schematically illustrating an overall configuration of a platform system to which a fuel cell power pack for a drone according to a first exemplary embodiment is applied, FIG. 2 is a diagram schematically illustrating a structure of the fuel cell power pack according to an exemplary embodiment, FIG. 3 is a diagram schematically illustrating a structure of a stack module according to an exemplary embodiment, and FIG. 4 is a block diagram schematically illustrating an internal configuration of the fuel cell power pack according to an exemplary embodiment.

Referring to FIGS. 1 to 4, a platform system 100 to which a fuel cell power pack for a drone according to a first exemplary embodiment is applied includes a fuel cell power pack 110, a drone main body 120, an administration server 130, a user terminal 140, and a ground control station (GCS) 150.

Here, the fuel cell power pack 110 may be mounted to the drone main body 120 to supply power to the drone main body 120, and may communicate wirelessly with the administration server 130 on the ground. The fuel cell power pack 110 and the drone main body 120 may be connected through a separate device. However, the fuel cell power pack 110 may also be built in the drone main body 120.

The fuel cell power pack 110 includes one or more fuel cell stack modules 111 which are electrically connected, a state information detector 112 which detects state information about the one or more fuel cell stack modules 111, a power pack controller 113 which controls to transmit the detected state information to the administration server 130, and a power pack communicator 114 which wirelessly transmits the detected state information to the administration server 130. In FIG. 1, one or more fuel cell stack modules 111 are represented as a stack 1, a stack 2, . . . , a stack n, and the like. The fuel cell stack modules 111, the state information detector 112, the power pack controller 113, and the power pack communicator 114 may be accommodated in a power pack main body (not illustrated). The power pack main body may be a container in which the fuel cell stack modules 111, the state information detector 112, the power pack controller 113, and the power pack communicator 114 are accommodated. The power pack body may be physically coupled to the drone main body 120.

The fuel cell power pack 110 may further include a memory (not illustrated) which stores state information of a plurality of fuel cell stack modules 111.

Further, the fuel cell power pack 110 includes the plurality of fuel cell stack modules 111 which are electrically connected, and the plurality of fuel cell stack modules 111 are turned on or off according to a control of the power pack controller 113 to supply power to the drone main body 120. Accordingly, the fuel cell power pack 110 is modularized by electrically connecting the plurality of fuel cell stack modules 111, and includes the power pack controller 113 which controls to turn on or off the fuel cell stack modules 111 and is mounted on a module. The fuel cell power pack 110 may be configured so that the one or more fuel cell stack modules 111 are electrically connected in parallel or in series within the module.

Further, one fuel cell stack module 111 may have a structure in which one stack controller 111-2 is mounted to one fuel cell stack 111-1. One fuel cell stack 111-1 is formed by electrically connecting and stacking one or more unit cells, and has a structure of stacking respective cells by separating the one or more unit cells through a separator and electrically connecting the one or more unit cells through a connection terminal. It is understood that this is only an example, and is not limited thereto and may also be implemented as other structures.

While it has been illustrated that the fuel cell power pack 110 is mounted inside the drone main body 120, the fuel cell power pack 110 is not limited thereto and may be realized as being mounted outside the drone main body 120.

Further, as illustrated in FIG. 4, the fuel cell power pack 110 may include a temperature sensor 115 which detects a temperature caused by heat which is generated as the one or more fuel cell stack modules 111 is turned on and driven, a voltage sensor 116 which detects a voltage of the one or more fuel cell stack modules 111, a current sensor 117 which detects a current of the one or more fuel cell stack modules 111, and a pressure sensor 118 which detects pressure in the fuel cell power pack 110 and hydrogen pressure in a fuel tank. The power pack controller 113 may transmit, to the administration server 130 through wireless communication, or store, in a memory, temperature information detected through the temperature sensor 115, voltage information detected through the voltage sensor 116, current information detected through the current sensor 117, and the pressure information detected through the pressure sensor 118 through the power pack communicator 114. That is, the power pack controller 113 controls the state information detector 112 to detect information of at least any one of the temperature, voltage, current, and pressure of the fuel cell stack module 111 or the pressure of hydrogen fuel in the fuel tank which is a component of the fuel cell power pack 110. Information including the temperature information, the voltage information, the current information, and the pressure information may be defined as the state information.

The state information detector 112 may detect a voltage level of the fuel cell stack modules 111. FIG. 5 is a diagram illustrating an example of detecting a voltage level through a state detector with respect to the fuel cell power pack according to an exemplary embodiment. Referring to FIG. 5, the state information detector 112 detects a voltage level (V) for the fuel cell stack module 111 through an anode terminal 111a and a cathode terminal 111b of each of the fuel cell stack modules 111. If the fuel cell power pack 110 is mounted to the drone main body 120, the power pack controller 113 may recognize that load of the drone main body 120 requires a certain power through an entire voltage value of the fuel cell stack modules 111 measured by the state information detector 112. Further, the fuel cell power pack 110 may turn on or off the fuel cell stack module 111 to supply, to the drone main body 120, the amount of power according to the amount of power required by the load of the drone main body 120.

The power pack controller 113 may directly transmit the voltage information and current information detected through the state information detector 112 to the drone main body 120 by using wired communication.

Further, the power pack controller 113 may transmit the state information to the administration server 130 through the power pack communicator 114 in a wireless communication manner.

The drone main body 120 may perform a flight operation by receiving a flight control command from the ground control station 150 according to a remote flight control of the user. Here, the flight control command may include a throttle command for an up and down control, a yawing command for a rotation control, a pitch command for a front and rear control, and a rolling command for a left and right control.

The administration server 130 may receive the state information of the fuel cell power pack 110 by wirelessly communicating with the drone main body 120, and store and manage the state information.

The user terminal 140 receives the state information of the fuel cell power pack 110 or a flight state information of the drone main body 120 from the administration server 130 through wireless communication, and displays the state information and the flight state information on a screen for the user to see the state information and the flight state information. For example, the user terminal 140 may include a smart phone, a personal digital assistant (PDA), or a wireless terminal carried by the user.

The ground control station 150 remotely controls the flight operation of the drone main body 120 such as takeoff or landing, left and right movement, up and down movement, and automatic flight of the drone main body 120, and provides a function of illustrating a geography around the drone main body 120 which flies based on a satellite picture or a map.

FIG. 6 is a block diagram schematically illustrating an overall configuration of a platform system to which a fuel cell power pack for a drone according to a second exemplary embodiment is applied.

Referring to FIG. 6, a platform system 200 to which a fuel cell power pack for a drone according to a second exemplary embodiment is applied may include a fuel cell power pack 110, a drone main body 120, an administration server 130, a user terminal 140, and a ground control station 150.

Here, the platform system 200 to which the fuel cell power pack for the drone according to the second exemplary embodiment is applied has a configuration similar to the platform system 100 of FIG. 1, but has a configuration different from that of FIG. 1 in which the fuel cell power pack 110 receives the flight information from the drone main body 120, and directly transmits the received flight information and the state information detected through the state information detector 112 to the administration server 130.

The drone main body 120 may include a flight controller 122 which controls a flight operation. The flight controller 122 may transmit flight information including information about a flight altitude, flight speed, current position, flight posture, and control status of the drone main body 120 to the power pack controller 113 through wired communication.

Accordingly, the power pack controller 113 may directly transmit, to the administration server 130, the temperature information detected through the temperature sensor 115, the voltage information detected through the voltage sensor 116, the current information detected through the current sensor 117, and the pressure information detected through the pressure sensor 118 as the state information by using wireless communication, or directly transmit, to the administration server 130, the information about the flight altitude, flight speed, current position, flight posture, and control status received from the drone main body 120 as the flight information by using wireless communication.

For example, the power pack controller 113 may control power supplied to the drone main body 120 by turning on the one or more fuel cell stack modules 111 when the power required by the drone main body 120 increases by a certain level or more, in a state in which the one or more fuel cell stack modules 111 are turned on.

Further, the power pack controller 113 may control power supplied to the drone main body 120 by turning off the one or more fuel cell stack modules 111 when the power required by the drone main body 120 decreases by a certain level or more, in a state in which the one or more fuel cell stack modules 111 are turned on.

For example, the power pack controller 113 may turn on the one or more fuel cell stack modules 111 according to a power consumption of the load in the remaining fuel cell stack modules 111, when the amount of load is detected at less than a low threshold, in a state in which the one or more fuel cell stack modules 111 are turned on and driven in the fuel cell power pack 110.

For example, the power pack controller 113 may adjust the power supplied from the fuel cell power pack 110 to the drone main body 120 by turning off the one or more fuel cell stack modules 111, if the power consumption amount of the load also decreases while a weight of the drone main body 120 decreases, in a state in which the one or more fuel cell stack modules 111 are turned on.

Further, the power pack controller 113 may adjust the power supplied from the fuel cell power pack 110 to the drone main body 120 by turning on the one or more fuel cell stack modules 111, if the power consumption amount of the load also increases while the weight of the drone main body 120 increases, in a state in which the one or more fuel cell stack modules 111 are turned on.

As an example, the power pack controller 113 may sequentially turn off the remaining fuel cell stack modules 111 other than one fuel cell stack module 111 as the amount of power required by the load decreases while the drone main body 120 starts to end the flight. Even if the drone main body 120 is landed completely and maintains an idle state again, and thus there is no power consumption, the power pack controller 113 may maintain only one fuel cell stack module 111 in the turned-on state.

FIG. 7 is a block diagram schematically illustrating an overall configuration of a platform system to which a fuel cell power pack for a drone according to a third exemplary embodiment is applied, and FIG. 8 is a diagram illustrating an example in which the fuel cell power pack for the drone according to the third exemplary embodiment transfers the state information to a flight controller of the drone main body by wire.

Referring to FIG. 7, a platform system 300 to which a fuel cell power pack for a drone according to a third exemplary embodiment is applied may include a fuel cell power pack 110, a drone main body 120, an administration server 130, a user terminal 140, and a ground control station 150.

The drone main body 120 may include a flight controller 122 which controls a flight operation and a drone communicator 124 which communicates wirelessly with the administration server 130. Here, the platform system 300 to which the fuel cell power pack for the drone according to the third exemplary embodiment is applied has a configuration similar to the platform system 200 of FIG. 6, but has a configuration different from that of FIG. 6 in which the power pack controller 113 of the fuel cell power pack 110 is electrically connected to the flight controller 122 of the drone main body 120 through a wire, and the power pack controller 113 transmits the state information detected through the state information detector 112 to the flight controller 122 through wired communication.

The flight controller 122 may transmit the state information received from the fuel cell power pack 110 to the administration server 130 through the drone communicator 124 by using wireless communication.

That is, the power pack controller 113 in the fuel cell power pack 110 transfers, to the flight controller 122 of the drone main body 120, the temperature information detected through the temperature sensor 115, the voltage information detected through the voltage sensor 116, the current information detected through the current sensor 116, and the pressure information detected through the pressure sensor 118 which detects pressure of the fuel cell power pack 110 and hydrogen pressure in the fuel tank as the state information by using wired communication. The flight controller 122 in the drone main body 120 transmits the state information received by wire to the administration server 130 through the drone communicator 124 by using wireless communication.

The flight controller 122 in the drone main body 120 may transmit, to the administration server 130, the flight information including the information about the flight altitude, flight speed, current position, flight posture, and control status according to the flight operation through the drone communicator 124 by using wireless communication.

The drone main body 120 performs the flight operation by receiving power from the fuel cell power pack 110. The flight controller 122 may control the flight operation in an emergency based on the state information including the temperature information, the voltage information, the current information, and the pressure information received from the power pack controller 113. Further, the flight controller 122 may transmit, to the administration server 130, the state information including the temperature information, the voltage information, the current information, and the pressure information received from the power pack controller 113 together with the flight information through the drone communicator 124.

The fuel cell power pack 110 may further include a memory 119 configured to store the state information detected through the state information detector 112. For example, the state information detector 112 may detect the state of the fuel cell power pack 110 at regular intervals to store the state in the memory 119, and the power pack controller 113 may read the state information stored in the memory 119 at regular time intervals to transfer the state information to the flight controller 122.

FIG. 9 is an operational flowchart for explaining a state information monitoring method of the fuel cell power pack for the drone according to an exemplary embodiment.

Referring to FIGS. 1 to 6 and 9, the state information detector 112 detects the state information of the one or more fuel cell stack modules 111 in operation S910.

That is, the state information detector 112 in the fuel cell power pack 110 may collect state information such as temperature, pressure, voltage, and current through each sensor. For example, the state information detector 112 may perform one or more operations among operations of detecting the temperature caused by heat which is generated as one or more fuel cell stack modules 111 are turned on and driven through the temperature sensor 115, detecting the voltage of the one or more fuel cell stack modules 111 through the voltage sensor 116, detecting the current of the one or more fuel cell stack modules 111 through the current sensor 117, or detecting the pressure of the fuel cell power pack 110 through the pressure sensor 118.

The power pack controller 113 transfers the detected state information to the power pack communicator 114 to transmit the detected state information to the administration server 130 in operation S920. The power pack controller 113 may transfer, to the power pack communicator 114, the temperature information detected through the temperature sensor 115, the voltage information detected through the voltage sensor 116, the current information detected through the current sensor 117, and the pressure information detected through the pressure sensor 118. Here, the power pack communicator 114 may transmit, to the administration server 130, the state information including the temperature information, the voltage information, the current information, and the pressure information.

Further, the power pack controller 113 may transmit the voltage information and the current information to the flight controller 122 of the drone main body 120 by using wired communication, and transfer the state information to the power pack communicator 114 by using wireless communication.

The power pack controller 113 may receive the flight information from the flight controller 122 of the drone main body 120 in operation S930. The power pack controller 113 may receive the flight information from the drone main body 120 through the flight controller 122 by using wired communication, or receive the flight information from the drone main body 120 at regular time intervals. Here, the flight information may include the information about the flight altitude, flight speed, flight distance, current position, flight posture, and control status of the drone main body 120.

If receiving the flight information from the drone main body 120, the power pack controller 113 transfers the flight information to the power pack communicator 114 to transmit the flight information to the administration server 130 in operation S940. The power pack controller 113 may store the detected state information, and the flight information received from the drone main body 120 in the memory. Further, the power pack controller 113 may store, in the memory 119, the flight information including the flight altitude, flight speed, flight distance, current location, flight posture, control status, and the like received from the drone main body 120.

The power pack controller 113 may transmit a signal requesting the flight information to the flight controller 122 if not receiving the flight information from the drone main body 120.

The power pack communicator 114 in the fuel cell power pack 110 wirelessly transmits the state information detected through the state information detector 112 and the flight information received from the drone main body 120 to the administration server 130 in operation S950. The power pack communicator 114 may transmit, to the administration server 130, the state information including the temperature information, the voltage information, the current information, and the pressure information detected through the state information detector 112 and the flight information including the flight altitude, flight speed, flight distance, current location, flight posture, control status, and the like received from the drone main body 120.

However, the power pack communicator 114 may transmit only the state information to the administration server 130, or only the flight information to the administration server 130.

Meanwhile, the administration server 130 may perform a function of storing the state information received from the fuel cell power pack 110 in an internal memory, or managing the state information to be used for the flight operation of the drone.

That is, the administration server 130 may transmit, to the ground control station 150, the state information including the temperature information, the voltage information, the current information, and the pressure information of the fuel cell power pack 110 received from the fuel cell power pack 110, or wirelessly transmit the state information to the user terminal 140 so that the user (e.g., an administrator) may confirm the state information.

Accordingly, the user (e.g., the administrator) may confirm the state information through the user terminal 140, and predict a flight available time, distance, or the like of the drone main body 120 based on the state information.

FIG. 10 is an operational flowchart for explaining a state information monitoring method of the fuel cell power pack for the drone according to another exemplary embodiment. For simplicity of description, description of overlapping contents is omitted.

Referring to FIGS. 1 to 5, 7, 8, and 10, the power pack controller 113 turns on or off the one or more fuel cell stack modules 111 in operation S1010.

Accordingly, the fuel cell power pack 110, which is mounted to the drone main body 120 and electrically connected to the flight controller 122, may supply power to the drone main body 120 through the one or more fuel cell stack modules 111 in the turned-on state.

The state information detector 112 detects the state information of the one or more fuel cell stack modules 111 in operation S1020.

Here, the fuel cell power pack 110 may store the state information detected by the state information detector 112 in the memory 119. That is, the fuel cell power pack 110 may store, in the memory 119, the state information including the temperature information detected through the temperature sensor 115, the voltage information detected through the voltage sensor 116, the current information detected through the current sensor 117, and the pressure information detected through the pressure sensor 118.

The power pack controller 113 transmits the detected state information to the flight controller 122 of the drone main body 120 by using wired communication in operation S1030.

That is, the power pack controller 113 may transmit the state information stored in the memory 119 or detected state information to the flight controller 122 of the drone main body 120 by using wired communication.

The flight controller 122 transmits, to the administration server 130, the state information including the temperature information, the voltage information, the current information, and the pressure information received from the fuel cell power pack 110 by using wireless communication through the power pack communicator 114 in operation S1040.

Accordingly, the administration server 130 on the ground may perform a function of storing the state information received from the fuel cell power pack 110 in an internal memory, or using the state information to manage the drone main body 120 so as to control the flight operation of the drone main body 120.

That is, the administration server 130 may transmit the state information of the fuel cell power pack 110 received from the drone main body 120 to the ground control station 150 so that the ground control station 150 may use the state information to control the flight operation of the drone main body 120, or transmit the state information to the user terminal 140 in a wireless communication manner so that the user (e.g., the administrator) may confirm the state information.

The user (e.g., the administrator) may confirm the state information through the user terminal 140, and predict the flight available time, distance, or the like of the drone main body 120 based on the state information.

Further, the flight controller 122 in the drone main body 120 may control the flight operation in an emergency based on the state information received from the fuel cell power pack 110.

As described above, the present disclosure may realize the fuel cell power pack for the drone and the state information monitoring method thereof in which if the fuel cell power pack, which supplies power by using gas such as hydrogen, is mounted to the drone, the fuel cell power pack detects its own state information to transmit the state information to the administration personal computer (PC) or the user's smart terminal on the ground or to share the state information with the drone through the communicator so as to increase the flight time and payload as compared to the existing battery, or receives the flight information from the drone to transmit the flight information separately or together with the state information to the administration personal computer (PC), the user terminal, or the like, thereby monitoring the fuel cell state to be used for the long-time flight operation of the drone.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A fuel cell power pack for a drone comprising:
a power pack main body coupled to the drone;
a fuel cell stack module comprising a plurality of fuel cell stacks which are electrically connected to each other, disposed in the power pack main body to receive fuel and air, and turned on or off a cording to a control of a power pack controller to supply a power to the drone;
a state information detector configured to detect state information of the fuel cell stack module, the state information including temperature, voltage, current, and pressure of the fuel cell stack module;
a power pack communicator configured to transmit information to an outside of the power pack main body or receive the information from the outside thereof by wire or wirelessly; and
a power pack controller configured to control the power pack communicator to transmit the state information of the fuel cell stack module detected by the state information detector to the outside of the power pack main body, and turn on or off each of the plurality of fuel cell stacks according to the state information of the fuel cell stack module detected by the state information detector.

2. The fuel cell power pack for the drone of claim 1,
wherein the power pack controller is configured to control the power pack communicator to wirelessly transmit the state information of the fuel cell stack module to an administration server.

3. The fuel cell power pack for the drone of claim 1,
wherein the power pack controller is configured to controls the power pack communicator to wirelessly transmit flight information and the state information of the fuel cell stack module to an administration server by receiving the flight information from the drone.

4. The fuel cell power pack for the drone of claim 1,
wherein the power pack controller is configured to control the power pack communicator to transmit the state information of the fuel cell stack module to the drone by wire.

5. A drone operation system comprising:
a drone comprising a flight controller; and
a power pack main body coupled to the drone, wherein the power pack main body comprises:
a fuel cell stack module comprising a plurality of fuel cell stacks which are electrically connected to each other configured to receive fuel and air, and turned on or off according to a control of a power pack controller to supply a power to the drone;
a state information detector configured to detect state information of the fuel cell stack module, the state information including temperature, voltage, current, and pressure of the fuel cell stack module;
a power pack communicator configured to transmit information to an outside of the power pack main body or receive the information from the outside thereof by wire or wirelessly; and
a power pack controller configured to control the power pack communicator to transmit the state information of the fuel cell stack module detected by the state information detector to the outside of the power pack main body, and turn on or off each of the plurality of fuel cell stacks according to the state information of the fuel cell stack module detected by the state information detector.

6. The drone operation system of claim 5,
wherein the power pack controller is configured to control the power pack communicator to wirelessly transmit the state information of the fuel cell stack module to an administration server or a user terminal.

7. The drone operation system of claim 5,
wherein the power pack controller is configured to control the power pack communicator to wirelessly transmit flight information and the state information of the fuel cell stack module to an administration server or a user terminal by receiving the flight information from the drone.

8. The drone operation system of claim 5,
wherein the power pack controller is configured to control the power pack communicator to transmit the state information of the fuel cell stack module to the flight controller by wire.

9. The drone operation system of claim 8,
wherein the drone further comprises a drone communicator, and
wherein the flight controller is configured to control the drone communicator to wirelessly transmit the state information of the fuel cell stack module received through the power pack communicator to an administration server or a user terminal.

10. The drone operation system of claim 9,
wherein the flight controller is configured to control the drone communicator to wirelessly transmit the flight information of the drone together with the state information to the administration server or the user terminal.

\* \* \* \* \*